J. P. DAHL-JENSEN.
PROCESS AND APPARATUS FOR MAKING INSULATORS.
APPLICATION FILED FEB. 24, 1911.
1,018,484.
Patented Feb. 27, 1912.
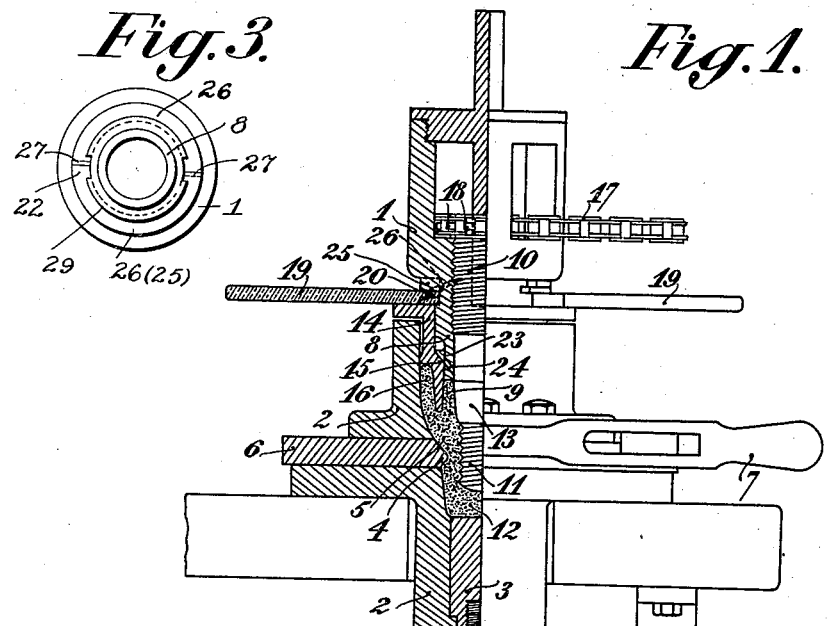
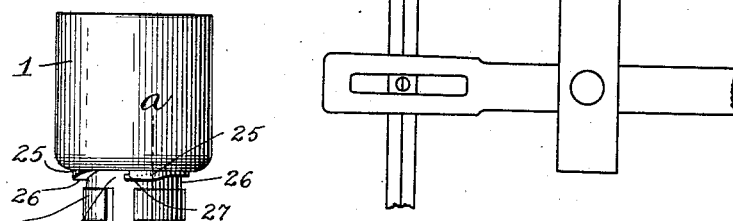
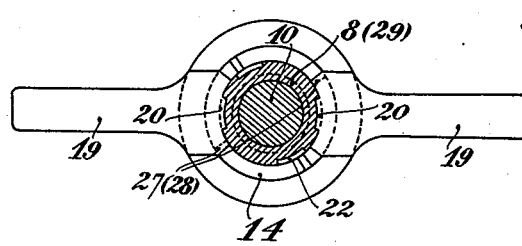
Witnesses:
Inventor,
Jens Peter Dahl-Jensen,
By
Atty.

UNITED STATES PATENT OFFICE.

JENS PETER DAHL-JENSEN, OF COPENHAGEN, DENMARK, ASSIGNOR TO AKTIESELSKABET BING & GRÖNDAHLS PARCELLAENSFABRIK, OF COPENHAGEN, DENMARK.

PROCESS AND APPARATUS FOR MAKING INSULATORS.

1,018,484. Specification of Letters Patent. Patented Feb. 27, 1912.

Application filed February 24, 1911. Serial No. 610,555.

*To all whom it may concern:*

Be it known that I, JENS PETER DAHL-JENSEN, of No. 16 Valby Langgade, Copenhagen, in the Kingdom of Denmark, sculptor, have invented certain new and useful Improvements in Processes and Apparatus for Making Insulators, of which the following is a specification, reference being had therein to the accompanying drawings.

The manufacture of insulators with a double petticoat or bell-rim or inside ring by the pressing of a pulverized porcelain mass has proven to be especially difficult, and this kind of insulator has hitherto been made out of a wet mass on a pallet or turning lathe, and, as a rule in different working stages and in two pieces, the inner petticoat or bell-rim being made separately. The difficulty encountered when trying to mold these insulators consists in the inside bell or petticoat being spoiled after the pressing operation by the return movement of the pressing die, and there has also been some uncertainty and especially loss of time connected with the making of the screw-hole.

Efforts have already been made to obviate the first mentioned drawback by supplying an elastic support in an axial direction to the inside bell-rim or petticoat, when removing that part of the die which fills the space between the inner and outer petticoats or bell-rims. This precaution, however, has not been successful. To raise, or rather to loosen, this part of the die which adheres tightly to the sides of the newly molded petticoats or bell-rims requires considerable power, especially during the first moment of loosening; the petticoat or bell-rim cannot always resist this powerful action in an axial direction, and is apt to break. The making of insulators by pressing molds on this principle had therefore again to be given up. A further reason was that in the use of these molds time was lost in the screwing up and down of the interior punch part or screw-nucleus, which was done by means of conical wheels and a crank-handle.

The present invention makes it possible to obtain a quick, reliable and faultless production of insulators of pulverized porcelain-mass, or the like, in a mold in such a manner that the die-part which fills the space between the petticoats or bell-rims is loosened, not as hitherto by an axial movement, but in the same manner as the central screw nucleus, by a turning movement. The bell-rim or petticoat is consequently not exposed to pull in axial, but in tangential direction, in which direction it presents a considerable resistance, and a breaking strain is quite out of the question when the loosening of the die-part takes place in this manner. It is not until after the great adherence between the die part and the sides of the petticoats or bell rims has been overcome by gently turning this portion of the die that the latter is raised or screwed out in axial direction.

A pressing mold made in accordance with this invention is shown by way of example in the accompanying drawings, wherein the matrix is stationary while the punch or die is connected with a movable head.

Figure 1 shows the pressing-mold in side elevation and partly in section. Fig. 2 is a horizontal section through the die or punch. Figs. 3 and 4 show the head-piece of the die, in bottom view and in side view respectively, and Figs. 5 and 6 are details of the turnable punch-part of the die.

The die comprises two members one movable with respect to the other, one a matrix and the other a plunger, the latter comprising the head-piece 1 of the die, which may be inserted in any suitable press, not shown. 2 is the matrix which at its lower end may be supplied with a moving piston 3 and at the location of the groove 4 of the insulator 5 with a part 6 capable of being opened by means of a locking device 7 of any known kind. If the insulator is to have several grooves, notches or holes, the removable parts like 6, 7, must be arranged accordingly.

The head-piece 1 of the die is supplied with a fixed prolongation, preferably of reduced diameter, whose lower end forms the pressure part acting axially upon the end of the inner petticoat or bell-rim 9 of the insulator 5. The head-piece 1, or the pressure-part 8 is in known manner screw-threaded inside. There is further a screw-threaded body 10 screwed inside the die and whose lower end 11 is threaded and forms the screw-hole in the top 12 of the insulator, while a smooth middle portion 13 between 10 and 11 forms the inner face of the inner bell-rim or petticoat 9. That portion of the smooth part 13 of body 10 that directly contacts with the insulator is preferably conical, as shown.

The body 10, 13, 11, may be moved independently of the head-piece 1, 8, preferably by means of a chain 17, a cord, or the like, laid around a wheel 18 mounted on 10, and for the passing of which through the head-piece there are suitable openings in the part 1.

The head-piece 1, 8, is supplied on the outside with a circular groove 21, Fig. 4, which serves as a guide for a ring or sleeve 14, whose lower part 15 forms the punch that shapes the outside of the inner petticoat or bell-rim 9, and the inner and bottom-side of the outer petticoat or bell-rim 16. The movement of the ring 14, 15 is obtained, for instance, by means of handles 19 of suitable length secured thereto and provided with projections 20, Figs. 5 and 6, which engage the groove 21. In the upper part of this groove are projections 25, whose bottom faces 26, Figs. 1 and 4, are shaped like a screw-thread of low pitch and which in front, that is to say at the most projecting end, is supplied with shoulders 27, Figs. 2–4. The face 26 is somewhat larger in diameter than the part 8. Corresponding to these projections are other shoulders 28, Figs. 2, 5 and 6, on the sides of the handles 19. These, or rather the projections 20, can turn freely in the lower part of the groove 12, and when they are almost in the plane $a-a$, Fig. 4, they, and with them the sleeve 15, will be held firmly against movement in an axial direction (the pressing position), but by a slight turning, for instance one-fourth of a revolution, they may be raised a suitable space (half the height of the groove) from the insulator, 5, 9, 16, and be held in this position by means of the shoulders 27 and 28. On the part 1 is a collar 29 below the groove 21 supplied with longitudinal grooves 22, Figs. 2–4, which correspond to the projections 20, so that the ring or sleeve 14, 15, with the handle 19, 20, may be freely brought in place on the part 1.

The annular space 23 between the parts 8 and 15 communicates through the groove 22 with the atmosphere, and air may pass through this passage and further through a hole 24, or several similar holes, in the part 8 and enter into the cavity in the top portion 12 of the insulator formed by screwing out the body 10, 13, 11.

The operation of the described pressing-mold is as follows: The matrix 2, closed below and on the sides is filled with pulverized mass, whereupon the die with the different punches in their mutual positions as shown in Fig. 1, is brought down against the mass to the lowermost position shown. By a simple pull on the chain 17 or the like, the innermost punch 11 is loosened and unscrewed. Thereupon the handles 19 are turned until the punch or sleeve 15 has been sufficiently loosened from the molded piece, whereupon the handles are raised along the helical guides 26 until the shoulders 27 and 28 engage with each other. The inner bell-rim or petticoat has now been safely and faultlessly released on the sides. The part 8 which holds it in axial direction, is finally raised by permitting the die to again move upward. The part 6 is then opened, and the molded piece is pushed out by the piston 3, and a fresh operation may now take place, when the body 10, 11, and the punch 14, 15 are again brought back to their proper positions.

The first releasing movement of the body 10, 11, which requires a certain, although less, exertion of strength than the punch 14, may be made easier by arranging in a suitable link of the chain 17 (or corresponding part of a cord or the like) a lever which with its short arm bears against the part 1, while pressure by hand is brought to bear upon the long arm, and the link in question (or corresponding part of a cord or the like) is pulled out a certain length in the moving direction of the chain. It it not necessary that the wheel or roller 18 be firmly fixed upon the body 10, 13, 11, or that it follow its axial movement, but it may be mounted slidably but not rotatably upon the said body. Further, the outer punch 14, 15, may be moved in any other manner than the one shown.

The parts 8, 29, need not be in one piece with the head-piece 1, but may form an independent part which eventually is adjustably connected or detachably connected to the head-piece 1.

The air for the cavity in the top 12 of the molded piece need not be admitted in the manner described, but may be admitted through another suitable passage, for instance through a channel in the body 10, 13, 11, there being arranged at the lower end of the screw 11 a guide valve, which normally closes the mouth of this channel, but opens it after the pressing operation and simultaneously with the first releasing movement of the body 10.

The invention is not limited to the production of molded pieces supplied with screw-holes, as these latter may be made at another stage of the manufacture, either before or after the molded piece has been pushed out of the mold. If it be desired, the petticoat or bell-rim may also be supported in axial direction, in a known manner.

I claim—

1. The production of insulators having a plurality of petticoats, which comprises pressing a suitable mass between dies, releasing by rotary movement that die portion between the petticoats, then lifting said die portion from contact therewith and subsequently removing other portions of the dies.

2. A mold of the character described, comprising a matrix and a plunger, said plunger having as one of its elements a movable portion to form the opposite walls of adjacent petticoats, means to first rotate and then lift said portion, prior to removal of the other portions of the plunger.

3. A mold of the character described, comprising a matrix and a plunger, said plunger having as one of its elements a movable portion to form the opposite walls of adjacent petticoats, handles for said movable portion and means to guide said handles and portion first in a rotary direction and subsequently in a spiral upward direction.

4. A mold of the character described, comprising a matrix and a plunger having a head-piece with a groove therein, one face of which is flat and the other helical, a member movable therein to form the opposite walls of adjacent petticoats, means on said member to permit the rotation of the member with respect to the head piece and to give said member a helical movement.

5. A mold of the character described, comprising a sectional matrix having one or more sections composed of a plurality of parts whose interior molding surfaces are of less diameter than the parts below them, a plunger comprising a head-piece, a central rotatable member, a wheel thereon, means to rotate the wheel member at will, an element rotatable and upwardly movable with respect to the head-piece at will, and guides to guide the element in its rotary movement and in its upward movement.

6. A mold of the character described comprising a matrix and a plunger having a rotatable and vertically movable molding element thereon, said plunger provided with a flat guide to guide said element during rotation and a helical guide to guide said element during its rising movement.

In testimony, that I claim the foregoing as my invention, I have signed my name in presence of two subscribing witnesses.

JENS PETER DAHL-JENSEN.

Witnesses:
ERNEST BOUTARD,
P. HOFMAN BANG.

---

Copies of this patent may be obtained for five cents each, by addressing the "Commissioner of Patents, Washington, D. C."